Patented May 3, 1949

2,469,288

UNITED STATES PATENT OFFICE 2,469,288

ACETAL RESINS

David E. Adelson and Harold F. Gray, Jr., Berkeley, Calif., assignors to Shell Development Company, San Francisco, Calif., a corporation of Delaware No Drawing. Application September 20, 1943, Serial No. 503,160

5 Claims. (Cl. 260—73)

This invention relates to acetal resins and to a method for their preparation. More particularly, the invention pertains to the manufacture of poly-allyl acetal resins and related materials.

It is an object of the present invention to provide a class of resinous substances with properties adapting them to a variety of uses. Another object is to provide resinous substances having properties which may vary within a range dependent on the chemical structure of the polymers. A further object is to provide a method for preparing insoluble and infusible acetal resins. A still further object is to provide resinous polymers of acetals of beta, gamma olefinic alcohols such as poly-allyl acetal. These and other objects of the invention will be apparent from the description given hereinafter.

The resinous products of the present invention are polymers of acetals of beta, gamma olefinic alcohols such as poly-allyl alcohol, for example. The beta, gamma olefinic alcohols or allyl-type alcohols are a distinct class of unsaturated alcohols consisting of allyl alcohol and its homologues which have an olefinic double-bonded linkage between the carbon atoms which are in the beta and gamma positions with respect to the carbinol group of the alcohol. The unsaturated alcohols have an olefinic linkage between two carbon atoms, to one of which is linked directly the saturated carbon atom having the hydroxy group of the alcohol linked directly thereto. Preferably at least one of the olefinic unsaturated carbon atoms has at least one hydrogen atom linked directly to it. These beta, gamma olefinic alcohols can be either primary, secondary or tertiary alcohols, and they contain in the molecule a structure which can be represented by the general formula

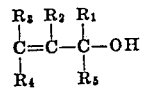

wherein each R represents a substituent, such as hydrogen, halogen or an organic radical, which latter is preferably a lower hydrocarbon radical. Preferred beta, gamma olefinic alcohols contain in the molecule a terminal methylene group attached by an olefinic double bond to a carbon atom which is directly attached to a saturated carbinol carbon atom as represented by the general formula

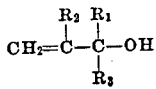

wherein each R represents a substituent, such as hydrogen, halogen or an organic radical, which latter is preferably a lower hydrocarbon radical. More particularly, preferred unsaturated alcohols are those wherein the carbinol carbon atom is primary or secondary in character as represented by the formula

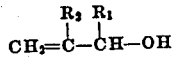

wherein each R represents a substituent, such as hydrogen, halogen, or an organic radical, which latter is preferably a lower hydrocarbon radical.

Examples of beta, gamma olefinic alcohols are allyl alcohol, methallyl alcohol, ethallyl alcohol, beta-chorallyl alcohol, gamma-chlorallyl alcohol, 3-hydroxy-butene-1, 3-hydroxy-pentene-1, 3-hydroxy-isopentene-1, 3-hydroxy-3-methylbutene-1, 3-hydroxy-2-methylpentene-1, 3-hydroxy-2-ethylbutene-1, 3-hydroxy-2,3-dimethylbutene-1, 3-hydroxy-pentadiene-1,4, and 3-hydroxy-hexene-1-yne-5. Other unsaturated alcohols of the class include crotyl alcohol, tiglyl alcohol 3-chlorobutene-2-ol-1, cinnamyl alcohol, 1-hydroxy hexadiene-2,4, 1-hydroxy-butadiene-2,3, 1-hydroxy-2-methyl hexene-2, 2-cyclohexanol, 2-cyclopentenol, etc.

While the invention embraces polymers of acetals of beta, gamma olefinic alcohols, a preferred group of products are those from beta, gamma olefinic alcohols which contain not more than 6 carbon atoms and from saturated aldehydes containing not more than 4 carbon atoms. Particularly preferred polymers are polybeta, gamma olefinic alkenyl acetals from aldehydes, like formaldehyde, acetaldehyde, propionaldehyde, butyraldehyde, and isobutyraldehyde. These polymeric acetals are from beta, gamma alkenols and include such typical products as formaldehyde polyallyl acetal, butyraldehyde polyallyl acetal and formaldehyde polymethallyl acetal.

Monomeric acetals are prepared by reacting a beta, gamma olefinic alcohol with an aldehyde. Any saturated aliphatic aldehyde may be used for this purpose such as formaldehyde, acetaldehyde, propionaldehyde, butyraldehyde, isobutyraldehyde, ethylbutanal, etc. While the acetalization may ordinarily be effected with the aldehydes per se, it is sometimes desirable to use those compounds capable of giving free aldehydes such as the paraldehydes, like paraformaldehyde.

The acetals are obtained by heating the alcohol and aldehyde in the presence of an acetalizing catalyst, preferably while removing formed water with the aid of an auxiliary substance.

Various salts and acids are suitable as catalysts for the reaction. In general, substantially neutral salts like the chlorides, bromides or nitrates of calcium, cerium, lithium, magnesium are well suited, with anhydrous calcium chloride being a particularly preferred catalyst. The beta-gamma olefinic alcohols which contain an unsaturated tertiary carbon atom linked directly to the carbinol group rearrange in the presence of acids to aldehydes, and the use of acid-acting salts or free acids with such compounds is not suitable. However, with the unsaturated alcohols devoid of the unsaturated tertiary carbon atom, the acetals can be prepared either with neutral salts or acid-acting salts like the chlorides, bromides or nitrates of aluminum, beryllium and iron, as well as aluminum sulfate, or with mineral acids such as hydrochloric, sulfuric or phosphoric acid.

In carrying out the process it is advantageous to remove the water from the reaction mixture substantially as fast as formed, and this is conveniently done by boiling the reaction mixture while having present therein an auxiliary substance which removes the water as an azeotropic distillate. For this purpose various volatile inert water-immiscible liquids may be utilized, such as benzene, toluene, xylene, hexane, ethylene dichloride or isopropyl ether, in the usual manner. Upon completion of the acetalization the product or reaction mixture is separated from the catalyst, preferably by a rapid distillation under reduced pressure of, say, less than 50 mm. pressure. The crude product may then be purified by ordinary fractional distillation to obtain the desired acetal.

By polymerizing the acetals of the beta, gamma olefinic alcohols according to the method of the invention a class of unique acetal resins is obtained. The monomeric acetals contain two polymerizable unsaturated groups, and by effecting polymerization through these groups the polymer obtained can be varied from a soluble, fusible polymer to an insoluble and infusible polymer. The polymerization of the compounds progresses through the following stages: monomer, soluble and fusible polymer (usually viscous liquid), insoluble and fusible polymer (gel), and insoluble and infusible polymer (a hard resin). Since the monomeric acetals are bifunctional, the polymerization can be conducted so as to give 3-dimensional cross-linkages in the polymer and produce insoluble and infusible resins. The acetal resins of the invention which are in the soluble and fusible state or the gel state can be further polymerized so as to be converted to the final state of insolubility and infusibility. These resins are seen to be thermosetting acetal resins. The polymeric acetals of the present invention are distinct and different from polyvinyl acetal resins in both properties and structure. Polyvinyl acetals are thermoplastic resins instead of thermosetting. Our resins can be prepared with the hydroxy groups of a polymeric alcohol completely acetalized, while polyvinyl acetal resins can be acetalized only to an extent of about 86% according to probability estimations of P. J. Flory, J. A. C. S. 61, 1518 (1939), and the actual polyvinyl acetal resins are acetalized to considerably less extent than this theoretical limit. Furthermore, the chemical structure of our acetal resins is different from that of polyvinyl acetal resins in having the two oxygen atoms of each acetal group separated by at least four intervening carbon atoms.

According to the process of the invention, the acetals are polymerized in the presence of an oxygen-yielding polymerization catalyst. The polymerization catalyst may be either a peroxide compound like benzoyl peroxide, hydrogen peroxide, barium peroxide, sodium peroxide, tetralin peroxide, olefin peroxides, acetyl peroxide, acetone peroxide, tertiary butyl hydroperoxide, ditertiary butyl peroxide, and the like, as well as other oxygen-yielding compounds such as an alkali metal perborate or an alkali metal persulfate. It is ordinarily preferred that the catalyst be a molecular oxygen-containing gas such as air, pure oxygen, or oxygen in admixture with inert gases like nitrogen, hydrogen, helium, methane, etc. The polymerization is effected preferably at a temperature above 100° C. but below the temperature at which appreciable decomposition of the material occurs. A most preferred range within which the polymerization is effected is between 100° C. and 200° C. In those cases in which the temperature of operation is above the normal boiling point of the monomeric material, it is necessary to employ super-atmospheric pressure sufficient to maintain at least part of the material in the liquid phase.

When using a molecular oxygen containing gas as catalyst, the gas is passed through the liquid material in a finely dispersed state so as to have intimate contact with the liquid. The exit gas contains some evaporated material and it is preferable to recover this by condensation and return to the reaction vessel by well-known methods. The peroxide compounds are not particularly stable at temperatures above 100° C. and when such elevated temperatures are used in effecting the polymerization with peroxide catalysts it is desirable to add fresh catalyst from time to time to supply that lost by decomposition. The amount of peroxide catalyst is suitably maintained between about 0.1% and 5%.

In polymerizing the momeric acetals in the presence of an oxygen-yielding catalyst, the polymerization or chemical binding of monomeric units to form the polymers appears to be affected at least to some extent by oxygen linkages between the monomeric units. On analysis, the polymers have been found to contain a small excess of oxygen over the theoretical, and it appears that this is due to the fact that some of the monomer units of the polymers are linked by oxygen, probably of ethereal nature, rather than being exclusively bound by carbon-to-carbon bonding through the unsaturated polymerizable groups.

As was stated hereinabove, the polymerization progresses through several degrees or states. The soluble, fusible modification of the polymer is obtained by interrupting the polymerization before gel formation occurs. The polymerization may be interrupted by numerous expedients such as discontinuing the heating or by destroying the catalyst, for example, by adding a reducing agent to the reaction mixture. Discontinuing the supply of molecular oxygen-containing gas can be used when this material is employed as catalyst. In preparing the soluble form of the polymer it is desirable that the polymerization reactions be interrupted before gel formation occurs, and this may be easily accomplished by following the course of the polymerization with observations of the refractive index of the reaction mixture. In general, the polymeric material has a higher refractive index than the monomer and as polymerization proceeds the refractive index of the reaction mixture increases. By observing the refractive index increase with a sample of the acetal which is to be polymerized to just the soluble form, a value can be obtained which will show the point at which polymerization must be interrupted before gel formation occurs.

The reaction mixture obtained in forming the soluble and fusible polymer contains some unreacted monomer and it may be desirable to remove this. The monomer can be removed by various methods, but it is preferably done by distillation under reduced pressure. If desired, the monomer may be removed by an extraction procedure, using a substance which is a solvent for the monomer but a non-solvent for the polymer. Suitable materials for this operation include alcohols, e. g. methyl alcohol, ethyl alcohol, the butyl alcohols, hexanols, dodecanols, etc., ethers, e. g. ethyl ether, isopropyl ether, butyl ethers, etc., and aliphatic hydrocarbons, e. g. hexanes, heptanes, octanes, etc. By pouring the crude reaction mixture into one of these materials the polymer is obtained as a precipitate and the monomer may be removed from the polymer by subjecting the precipitated material to filtration. The soluble modification of the polymer is particularly suitable for surface coating preparations since it may be further polymerized to the hard, insoluble and infusible state. For this use it may be employed as a solution in a suitable solvent such as acetone, methyl ethyl ketone, methyl isobutyl ketone, cyclopentanone, cylohexanone, ethyl acetate, isopropyl acetate, the butyl acetates, benzene, toluene, etc. If desired, a mixture of solvents may be employed or a mixture containing non-solvents in such proportion that the whole mixture acts as a solvent for the polymer. Various other ingredients of the composition may be used, such as other resins, pigments, plasticizers, etc. The coating material is applied to a surface which it is desired to cover and the resulting film is subjected to a baking treatment to convert the soluble polymer to the insoluble inform. When applied as a thin film, the oxygen of the air acts as catalyst to complete the polymerization of the polymer. If desired, of course, a peroxide polymerization catalyst may be incorporated with the polymer to aid and shorten the time of conversion to the solid resin during the baking treatment. Other catalysts, such as siccatives like cobalt, manganese, and/or lead naphthenates, resinates, linoleates, etc., may be used to complete the polymerization.

The gel form of the polymer which is insoluble but moldable and thermosetting is another useful modification of the invention. This moldable polymer is obtained by subjecting the unsaturated acetals to polymerization until gel formation occurs, and interrupting the polymerization at this point. The gel may be separated from other constituents of the reaction mixture by treating the mixture with an organic solvent and extracting lower soluble polymers and unpolymerized monomer so as to leave essentially only the gel. By grinding the gel to a powder form and, if desired, incorporating a peroxide catalyst, molded articles can be prepared under the action of heat and elevated temperatures by well-known methods. The action of heat and pressure fuses the gel to a coherent mass and the polymerization progresses to the insoluble and infusible stage whereby a hard resin is obtained.

The polymeric acetals of beta, gamma olefinic alcohols are also useful in providing a material whereby polymeric beta, gamma olefinic alcohols can be prepared. While the beta, gamma olefinic alcohols can be polymerized in the presence of an oxygen-yielding catalyst, the free hydroxy group of the alcohol is attacked to a greater or lesser extent during the polymerization so that the polymer usually contains some aldehyde or acid groups in place of the starting hydroxy groups when a primary unsaturated alcohol is polymerized. By protecting the hydroxy group of the alcohol by having it acetalized during the polymerization operation, a superior polymeric alcohol is obtainable. The polymeric acetals are readily de-acetalized to give the polymeric alcohol. The polymeric alcohol is prepared by forming a monomeric acetal of the beta, gamma olefinic alcohol which it is desired to obtain in polymeric form. A saturated aldehyde is used for this purpose such as formaldehyde or acetaldehyde. The formed acetal is then polymerized according to the method of the invention to the soluble and fusible state or to the gel state. Either of these polymeric forms, preferably after removal of monomer and/or lower polymers, is subjected to hydrolysis. The hydrolysis or de-acetalization is conveniently effected with steam at an elevated temperature. By heating the polymer with water or steaming it at a temperature of from say, 100° C. to 200° C. and removing the released aldehyde with the steam, the polymeric acetal is de-acetalized to yield the polymeric alcohol. If desired, a small quantity of a mineral acid can be used as catalyst to assist the hydrolysis.

Instead of preparing the acetals of the beta, gamma olefinic alcohols and subjecting them to polymerization to obtain the resins, the unsaturated alcohols may be first polymerized to form polymeric alcohol, which is then acetalized if desired. The polymers of the beta, gamma olefinic alcohols can be obtained by several methods. The unsaturated alcohols may be subjected to treatment whereby the alcohols are directly polymerized in liquid phase by heating at a temperature between about 50° C. and 200° C. in the presence of a peroxide polymerization catalyst or in intimate contact with gaseous oxygen, or they may be obtained by indirect methods, for example, the monocarboxylic acid esters of the beta, gamma olefinic alcohol may be polymerized according to the method described in U. S. Patent No. 2,374,081, and this polymer then subjected to alcoholysis according to the method described in copending application Serial No. 425,118, filed December 31, 1941. By starting with a polymeric alcohol, the resin obtained cannot be completely acetalized because of probability considerations. However, such resins are characterized by being soluble in a variety of organic solvents.

The polymeric alcohols are acetalized by treating with an aldehyde in the presence of a mineral acid such as sulfuric, hydrochloric or phosphoric acid. It is desirable that the reaction mixture be homogeneous and for this purpose the polymeric alcohol is dissolved in water or a lower aliphatic alcohol. To this solution is added the catalyst, followed by addition of the aldehyde. While the reaction will occur at ordinary temperature, it is preferable to heat the reaction mixture up to temperatures of about 100° C. in order to effect the desired reaction. The reaction is not very rapid and may require 20 to 40 hours to obtain substantial acetalization of the polymeric alcohol. The formed polymeric acetal is suitably recovered from the mixture by addition of a large quantity of water whereby the polymer is precipitated. The polymeric acetal is freed of the acid catalyst either by careful neutralization with bases or by successive washings with water. The polymeric acetal obtained in this manner is believed to be essentially linear in structure and consequently the polymer is soluble in a variety of organic materials. Any aldehydes may be employed in forming the acetal such as was illustrated in forming the monomeric acetal.

The acetals of the beta, gamma olefinic alcohols can be polymerized alone, as described hereinbefore, or in admixture with one another or with other polymerizable compounds. Particularly desirable co-polymers are obtained by polymerization of the monomeric acetals with other polymerizable compounds containing a carbon-to-carbon double-bonded polymerizable group. The acetals may be polymerized with compounds containing two or more conjugated groups such as butadiene and substituted butadienes, such as chloroprene, as well as polymers of acetylene like vinyl and divinyl acetylene. A class of co-polymerizable compounds consists of those having two or more polymerizable non-conjugated double bonds. An important sub-class consists of the unsaturated aliphatic poly-esters of saturated polybasic acids, examples of which are divinyl, diallyl, dimethallyl esters of oxalic, malonic, citric and tartaric acids, as well as the corresponding tri-esters of citric acid. Another sub-class consists of the unsaturated aliphatic poly-ethers of saturated polyhydric alcohols such as divinyl, diallyl, dimethallyl ethers of glycol, diethylene glycol, triethylene glycol, trimethylene glycol, propylene glycol, the corresponding di- and tri-ethers of glycerol and similar derivatives of glycerol, diglycerol, mannitol, sorbitol, pentaerythritol, and the like, wherein two or more hydroxyl groups of the polyhydric alcohol are etherified with the unsaturated radical. Another sub-class consists of the unsaturated aliphatic organic acid poly-esters of polyhydric alcohols such as acrylic and methacrylic poly-esters of glycol, diethylene glycol, propylene glycol, trimethylene glycol, ethylidine glycol, glycerol, diglycerol, mannitol, sorbitol, resorcinol, etc. Other polymerizable unsaturated compounds containing two or more unsaturated carbon-to-carbon linkages unconjugated with respect to one another are the unsaturated aliphatic alcohol esters of the unsaturated aliphatic acids, such as vinyl, allyl and methallyl esters of acrylic, methacrylic, chloroacrylic, crotonic, itaconic, citraconic and cinnamic acids. Others are the unsaturated poly-esters of aromatic polycarboxylic acids such as di-allyl, dimethallyl, divinyl esters of phthalic, isophthalic, teraphthalic and naphthalene dicarboxylic acids. Special mention is made of 3-component polymers containing at least one di-olefin residue, specific examples of which are co-polymers of butadiene, acrylonitrile, and allyl acetal.

The compounds to be co-polymerized will usually be admixed prior to any substantial polymerization. The most satisfactory resins are ordinarily obtained from mixtures of monomers which are soluble in one another and which undergo interpolymerization resulting in molecules each containing units of the initial monomers. Novel and valuable effects are sometimes obtained by the co-polymerization of compounds which are incompletely miscible with one another in monomeric and/or polymeric form which fail to interpolymerize or which interpolymerize imperfectly. A useful modification of this standard procedure of co-polymerization consists in the separate partial polymerization of two or more compounds followed by the mixing together of the partial polymers and completion of the polymerization. In another procedure, one or more monomers are mixed with a partial polymer, partial co-polymer, or mixture of partial polymers, followed by completion of polymerization.

The novel acetal resins of the invention have varied utility. The resins can be made in the form of sheets, rods, tubes, thin films, filaments, fibers, and molding powders. The hard, completely polymerized resins can be turned on a lathe, sawed, drilled, filed and punched to form various articles of manufacture. Sheets and thin films in the fusible state can be molded under head and pressure into any desired article. Some of the resins can be used as glass substitutes. Others have properties which make them useful in laminates as interlayers or adhesives in safety glass, laminated wood and laminated paper. Particularly desirable laminates are obtained by the use of glass cloth as interlayer. The resinous materials may be fabricated into a variety of articles such as fountain pen barrels, brush-backs, umbrella handles, door-knobs, articles of furniture and ornamentation, reflectors, lenses for correction of defective vision, telescope and microscope lenses, lenses for protective goggles, eye and face shields, splints, and surgical instruments. Resins of the invention which have high dielectric strength are used for electrical insulation such as in coatings on electrical conductors, separators or co-axial cables, cores and coatings for electrical coils, and as separators in batteries. The hard, physiologically inactive resins can be used in dentures, dental crowns, inlays and fillings. Modified polymers, especially those containing dyes and/or pigments, such as pearl essence, make attractive jewelry.

For the purpose of further illustrating the invention, the following examples are given, it being understood that the invention is not to be construed as limited to specific details given therein.

*Example I*

Formaldehyde allyl acetal was prepared from allyl alcohol and paraformaldehyde. A mixture of 120 gms. of paraformaldehyde, 464 gms. of allyl alcohol, 12 gms. of anhydrous ferric chloride and 50 cc. of benzene was refluxed in a vessel fitted with a distillation head for separating water. The refluxing was continued until 104 cc. of water had been separated and collected by azeotropic distillation with the benzene. The liquid contents of the reaction vessel were then separated from the catalyst by vacuum distillation and redistilled at atmospheric pressure whereby 315 gms. of product was obtained. Analytical data and physical constants of the formaldehyde diallyl acetal are as follows:

| | Found | Calculated |
|---|---|---|
| Carbon, percent | 65.3 | 65.6 |
| Hydrogen, percent | 9.4 | 9.4 |
| Oxygen (by diff.), percent | 25.3 | 25.0 |
| Bromine No., gms. Br$_2$/100 gms | 247 | 249 |
| Acetal Value, equiv./100 gms | 0.77 | 0.78 |
| Boiling Point, °C | 139.7–140.2 | |
| Specific Gravity, 20/4 | 0.887 | |
| Refractive Index, 20/D | 1.4232 | |

About 10.4 gms. of the formaldehyde allyl acetal was heated at about 130° C. while bubbling air therethrough at a rate of about 5 bubbles per second. After 20 hours treatment, the material had just gelatinized to a practically colorless gel having a refractive index of 1.464 (20/D). A sample weighing 3.6905 gms. was extracted with acetone to remove unpolymerized monomer and soluble polymer. The insoluble portion which remained after the extraction treatment amounted to 0.997 gm. The extract after evaporation of the acetone was a liquid which gelled in a few days time in contact with air. The liquid could be further polymerized to a hard infusible insoluble resin.

The insoluble gel which remained as the extraction residue was analyzed. From the following results of the analysis, it appears that the polymer contains additional oxygen to the extent of about one atom of oxygen for each monomer unit.

|  | Per cent Carbon | Per cent Hydrogen | Per cent Oxygen |
|---|---|---|---|
| Calculated for: | | | |
| (Monomer)$_n$ | 65.6 | 9.4 | 25.0 |
| (Monomer+½ O$_2$)$_n$ | 58.3 | 8.3 | 33.4 |
| Found | 60.1 | 8.5 | 31.4 |

*Example II*

A mixture of 34.2 gms. of paraformaldehyde, 169 gms. of methallyl alcohol, 20 gms. of anhydrous calcium chloride and 50 cc. of benzene was refluxed and 19 cc. of water was removed. The liquid material was flash distilled from the solids at about 1 mm. pressure. The distillate was redistilled at atmospheric pressure to obtain 61 gms. of the formaldehyde methallyl acetal which was analyzed and the physical constants determined with the following results:

|  | Found | Calculated |
|---|---|---|
| Carbon, per cent | 68.9 | 69.2 |
| Hydrogen, per cent | 10.3 | 10.3 |
| Oxygen (by diff.), per cent | 20.8 | 20.5 |
| Bromine No., gms. Br$_2$/100 gms | 199 | 205 |
| Boiling Point, °C | 174-176 | |
| Specific Gravity | 0.882 | |
| Refractive Index, 20/D | 1.4339 | |

The formaldehyde methallyl acetal was polymerized by heating at 130° C. while bubbling air through it. The refractive index of the material was determined in order to ascertain whether polymerization was occurring. Polymers have higher values of refractive index than do monomers and an increase of refractive index indicates that polymerization has occurred. After treating for 39 hours, the refractive index (20/D) increased from 1.4339 to 1.4868 and the material was a very viscous liquid nearly at the gel state. Analysis of the product indicated that some oxygen had combined in forming the polymer as is apparent from the following table:

|  | Per cent Carbon | Per cent Hydrogen | Per cent Oxygen |
|---|---|---|---|
| Calculated for: | | | |
| (Monomer)$_n$ | 69.2 | 10.3 | 20.5 |
| (Monomer+½ O$_2$)$_n$ | 62.9 | 9.3 | 27.8 |
| Found | 63.3 | 9.1 | 27.8 |

*Example III*

A mixture of 132 gms. of allyl alcohol and 20 gms. of anhydrous calcium chloride was shaken and cooled to about 0° C. in a brown bottle. To the mixture was added 50 gms. of cold acetaldehyde and the bottle shaken vigorously for about 10 minutes whereupon the mixture warmed to about 35° C. and a milky lower layer separated. The bottle was shaken every hour for 15 to 20 seconds during 16 hours after which the contents were transferred to a separatory funnel. The lower layer was removed and diluted with water, whereupon about 15 cc. of upper layer formed. This upper layer was combined with the first upper layer and the mixture was washed with three 35 cc. portions of distilled water. The washed organic material was dried with anhydrous potassium carbonate and distilled to recover 74.5 gms. of pure product. Analysis and determination of physical constants gave the following results:

|  | Found | Calculated |
|---|---|---|
| Carbon, Per cent | 67.2 | 67.5 |
| Hydrogen, Per cent | 9.9 | 9.9 |
| Oxygen (by diff.), Per cent | 22.9 | 22.6 |
| Acetal, Per cent | 101.8 | 100.0 |
| Bromine No., gms. Br$_2$/100 gms | 222 | 225 |
| Boiling Point, °C | 148-152 | |
| Specific Gravity, 20/4 | 0.877 | |
| Refractive Index, 20/D | 1.4235 | |

The acetaldehyde allyl acetal was polymerized by heating at 125 to 130° C. while bubbling air through at a rate of about 5 bubbles per second. Observations were made of the refractive index (20/D) at intervals and the increase is tabulated below.

| Hours | Gain in R. I. |
|---|---|
| 13 | 0.0182 |
| 33 | 0.0313 |
| 52 | 0.0390 |
| 71.5 | 0.0426 |

The polymer obtained was a very viscous liquid which analyzed as follows:

|  | Per cent Carbon | Per cent Hydrogen | Per cent Oxygen |
|---|---|---|---|
| Calculated for: | | | |
| (Monomer)$_n$ | 67.5 | 9.9 | 22.6 |
| (Monomer+½ O$_2$)$_n$ | 60.7 | 8.9 | 30.4 |
| Found | 64.9 | 9.4 | 25.7 |

*Example IV*

Acetaldehyde methallyl acetal was prepared according to the method described in Example III using the same quantities of materials except that 165 gms. of methallyl alcohol was substituted for the allyl alcohol. About 85 gms. of pure product was obtained which had the following analysis and physical constants.

|  | Found | Calculated |
|---|---|---|
| Carbon, percent | 70.4 | 70.6 |
| Hydrogen, percent | 10.8 | 10.6 |
| Oxygen, (by diff.), percent | 18.8 | 18.8 |
| Acetal, percent | 100.0 | 100.0 |
| Bromine No., gms. Br$_2$/100 gms | 184 | 188 |
| Boiling Point, °C | 182-184 | |
| Specific Gravity, 20/4 | 0.871 | |
| Refractive Index, 20/D | 1.4324 | |

The product was polymerized according to the method described in Example III with observations at intervals of the refractive index ($n$/D). The increase of refractive index is tabulated below:

|  | Per cent Carbon | Per cent Hydrogen | Per cent Oxygen |
|---|---|---|---|
| Calculated for: | | | |
| (Monomer)$_n$ | 70.6 | 10.6 | 18.8 |
| (Monomer+½ O$_2$)$_n$ | 64.6 | 9.7 | 25.7 |
| Found | 65.7 | 9.6 | 24.7 |

Example V

Polyallyl alcohol was prepared by heating allyl alcohol at 100° C. for 116 hours in the presence of hydrogen peroxide. The polyallyl alcohol had a molecular weight of 280 by cryscopic determination in acetic acid. Formaldehyde polyallyl acetal was prepared from the polyallyl alcohol.

A mixture of 31.6 gms. of the polyallyl alcohol, 9 gms. of formaldehyde (as 36% aqueous solution), 2.9 gms. of concentrated sulfuric acid and 118 gms. of water, was heated at 60° C. to 65° C. under a reflux condenser for 30 hours. The solution increased in viscosity as the heating continued and at approximately the half-way point, a yellow rubbery mass began to precipitate. After the reaction was over, the rubbery material was ground in a mortar and extracted with water. The residue was dried in vacuo to give 13.8 gms. of product. The formaldehyde polyallyl acetal was insoluble in water and common organic solvents, but was fusible and could be molded. Upon molding at 120° C. under 3500 p. s. i., it gave a very hard, brittle, nearly transparent resin.

The formaldehyde polyallyl acetal was analyzed and found to have an acetal value of 0.235 equiv. per 100 gms. which indicates that 30.1 per cent acetalization had been attained. Carbon and hydrogen analysis of the resin gave the following results:

| | Found | Calculated for 30.1% acetalization |
|---|---|---|
| Carbon, percent | 62.1 | 63.2 |
| Hydrogen, per cent | 9.3 | 10.0 |
| Oxygen (by diff.), per cent | 28.6 | 26.8 |

Example VI

Polyallyl alcohol (30.8 gms.) prepared as described in Example V was dissolved in 100 cc. of water and 25 cc. of methyl alcohol. A solution of 19.8 gms. of sulfuric acid in 50 cc. of methyl alcohol was added. To the well-stirred solution was added dropwise 57.5 gms. of isobutyraldehyde in 57 gms. of methyl alcohol. The resulting solution was stirred at room temperature for 45 hours, poured into 2 liters of water and the suspension thus formed was made faintly alkaline to phenolphthalein. The precipitated resin was washed with water by decantation until the wash waters were neutral, dissolved in acetone, reprecipitated by water and the resin dried in vacuo at 80 to 100° C. The product was a pale yellow, transparent resin which was soluble in methyl alcohol, normal butyl alcohol, acetone, cyclohexanone, dioxane, ethyl acetate, pyridine and chloroform; it was slightly swollen by isopropyl ether and benzene, and swollen to chlorobenzene.

Analysis of the isobutyraldehyde polyallyl acetal gave an acetal value of 0.345 equiv. per 100 gms. indicating 58.7 per cent acetalization. Analysis for carbon and hydrogen gave the following results:

| | Found | Calculated for 58.7% acetalization |
|---|---|---|
| Carbon, per cent | 66.0 | 67.1 |
| Hydrogen, per cent | 10.1 | 10.4 |
| Oxygen (by diff.), per cent | 23.9 | 22.5 |

Example VII

Isobutyraldehyde polyallyl acetal was prepared from polyallyl alcohol which was obtained by alcoholysis of polyallyl acetate. Allyl acetate was polymerized at 65° C. in the presence of 2 per cent benzoyl peroxide and some unpolymerized allyl acetate present in the reaction mixture removed therefrom. The polyallyl acetate was reacted with allyl alcohol in the presence of sodium allylate and the formed allyl acetate distilled from the reaction mixture leaving polyallyl alcohol as the residue.

A solution of 34.6 gms. of the polyallyl alcohol dissolved in 100 cc. of water and 25 cc. of methyl alcohol was placed in a flask fitted with a stirring device, reflux condenser and dropping funnel. The solution was cooled and 18.75 gms. of sulfuric acid in 50 cc. of methyl alcohol were added to the cooled mixture. A solution of 54 gms. of isobutyraldehyde in 75 cc. of methyl alcohol was then added dropwise to the contents of the flask. The mixture was stirred for about 64 hours and was poured into 2 liters of water, whereupon a cream-colored, dough-like material precipitated out and floated to the surface. The rubber-like acetal was filtered off, washed several times with warm water and dried under high vacuum for 3 hours at 80° C. to 100° C. The product, in an amount of 27.9 gms., was a cream-colored, thermoplastic solid.

An analysis of the resin product gave the following results:

| | |
|---|---|
| Carbon, per cent | 62.55 |
| Hydrogen, per cent | 10.05 |
| Oxygen (by diff.), per cent | 27.40 |
| Acetyl value, equiv./100 gms. | 1.028 |
| Ester value, equiv./100 gms. | 0.015 |
| Acetal value, equiv./100 gms. | 0.164 |

The analysis indicates that the polymer contains the following distribution of constituents:

| | Per cent |
|---|---|
| Alcohol | 59.6 |
| Acetal | 27.9 |
| Ester | 1.1 |
| Remainder, possibly as ether | 11.4 |

An ethyl alcohol solution of the acetal resin was evaporated to a viscous solution which was spread on a glass plate. Another glass plate was pressed on top and the sandwich was baked at 165° C. for 15 minutes with a 500 gm. weight resting on the plates. The laminated plates had excellent adhesion between them.

Example VIII

About 69.2 gms. of polyallyl alcohol prepared by alcoholysis of polyallyl acetate as described in Example VII were placed in a flask fitted with a stirring device, reflux condenser and a dropping funnel. This material was dissolved by addition of 100 cc. of water and 25 cc. of methyl alcohol. A solution of 37.5 cc. of sulfuric acid dissolved in 50 cc. of methyl alcohol was added to the flask, the contents of which had been cooled. An atmosphere of nitrogen was introgen into the flask and maintained there during the remainder of the operation. A solution of 84 gms. of acrolein in 100 cc. of methyl alcohol was added dropwise to the stirred contents of the flask and the reaction mixture was stirred at room temperature for 72 hours during which time an additional 100 cc. of methyl alcohol was added to prevent precipitation. The reaction mixture was then poured into 2 liters of water and a light, dough-like material obtained as precipitate. The precipitate was washed with water and then with acetone. It was subjected to drying under reduced pressure at room temperature followed by squeezing under 300 pounds pressure to remove liquid and the final acetone was taken off by drying under vacuum. The product was ground up and 300 cc. of ethyl alcohol added. The resin partly dissolved and the insoluble resin filtered from the solution. The alcohol was evaporated from the filtrate until the solution became viscous, whereupon it was added to a liter of acetone from which the acetal precipitated, was separated and dried under vacuum. The alcohol-soluble portion of the formed acetal resin amounted to 10.3 gms. while the insoluble portion was 18 gms. The alcohol-soluble portion was infusible when heated to 143-147° C. under 2000 p. s. i. in the presence of 1% hexamethylenetetramine as catalyst.

We claim as our invention:

1. The homopolymer of a di-allyl acetal of a saturated aliphatic aldehyde of 1 to 4 carbon atoms.

2. The homopolymer is di-allyl butyral.

3. The insoluble and infusible homopolymer of di-allyl butyral.

4. The homopolymer of di-allyl formal.

5. The insoluble and infusible homopolymer of di-allyl formal.

DAVID E. ADELSON.
HAROLD F. GRAY, Jr.

REFERENCES CITED

The following references are of record in the file of this patent:

UNITED STATES PATENTS

| Number | Name | Date |
| --- | --- | --- |
| 2,124,630 | Quattlebaum | July 26, 1938 |
| 2,197,357 | Widmer | Apr. 16, 1940 |
| 2,273,891 | Pollack | Feb. 24, 1942 |
| 2,318,959 | Muskat | May 11, 1943 |
| 2,332,895 | D'Alelio | Oct. 26, 1943 |
| 2,332,900 | D'Alelio | Oct. 26, 1943 |
| 2,386,999 | Adelson et al. | Oct. 16, 1945 |

FOREIGN PATENTS

| Number | Country | Date |
| --- | --- | --- |
| 115,593 | Australia | Aug. 6, 1942 |

Certificate of Correction

Patent No. 2,469,288                                                                       May 3, 1949

DAVID E. ADELSON ET AL.

It is hereby certified that error appears in the printed specification of the above numbered patent requiring correction as follows:

Column 13, line 25, for the words "is di-allyl" read *of di-allyl*;

and that the said Letters Patent should be read with this correction therein that the same may conform to the record of the case in the Patent Office.

Signed and sealed this 21st day of March, A. D. 1950.

[SEAL]

THOMAS F. MURPHY,
                                                                         *Assistant Commissioner of Patents.*